US006606653B1

(12) United States Patent
Ackermann, Jr. et al.

(10) Patent No.: US 6,606,653 B1
(45) Date of Patent: Aug. 12, 2003

(54) UPDATING OF EMBEDDED LINKS IN WORLD WIDE WEB SOURCE PAGES TO HAVE THE NEW URLS OF THEIR LINKED TARGET WEB PAGES AFTER SUCH TARGET WEB PAGES HAVE BEEN MOVED

(75) Inventors: Jack Ronald Ackermann, Jr., Round Rock, TX (US); John Maddalozzo, Jr., Austin, TX (US); Gerald Francis McBrearty, Austin, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/414,338

(22) Filed: Oct. 7, 1999

(51) Int. Cl.[7] .............................................. G06F 15/16
(52) U.S. Cl. ...................... 709/219; 709/203; 707/513
(58) Field of Search ................................ 709/219, 245, 709/203; 707/501, 511, 513, 201, 203, 10

(56) References Cited

U.S. PATENT DOCUMENTS

| 5,751,956 | A | * | 5/1998 | Kirsch .......................... 709/203 |
| 5,813,007 | A | * | 9/1998 | Nielsen ......................... 707/10 |
| 5,978,828 | A | * | 11/1999 | Greer et al. .................... 707/10 |
| 6,041,360 | A | * | 3/2000 | Himmel et al. ................ 709/245 |
| 6,163,778 | A | * | 12/2000 | Fogg et al. ..................... 707/10 |
| 6,192,375 | B1 | * | 2/2001 | Gross ............................ 707/200 |
| 6,219,818 | B1 | * | 4/2001 | Freivald et al. ................ 714/799 |
| 6,253,204 | B1 | * | 6/2001 | Glass et al. .................... 707/102 |
| 6,321,242 | B1 | * | 11/2001 | Fogg et al. ..................... 707/513 |
| 6,449,615 | B1 | * | 9/2002 | Liu et al. ....................... 707/10 |

FOREIGN PATENT DOCUMENTS

| JP | 10333966 A | * | 12/1998 | ............ G06F/12/00 |
| JP | 2000322434 A | * | 11/2000 | ............ G06F/17/30 |

* cited by examiner

Primary Examiner—Dung C. Dinh
Assistant Examiner—Bradley Edelman
(74) Attorney, Agent, or Firm—Diana L. Roberts; Volel Emile; J. B. Kraft

(57) ABSTRACT

Embedded links or hotspots in source Web pages are upgraded to reflect the new Universal Resource Locations (URLs) of moved target Web Pages. In a World Wide Web communication network with user access via a plurality of data processor controlled interactive display stations for displaying Web pages transmitted to receiving display stations from Uniform Resource Locations (URLs) remote from said stations, said Web pages being linkable with each other through embedded links in source Web page, a system is provided for updating said embedded links in source Web pages when the URL of a target Web page is moved. The basic system includes means associated with the target Web page of a selected link in a requesting Web page for informing the requesting page that the target page has moved together with means associated with the requesting page responsive to this informing means for forwarding the URL of the source web page of the requesting page to the original URL of the target page so that the source Web page may be thus upgraded on a one time basis the first time a requesting Web page from this source tries to link to a target page with a new URL.

21 Claims, 4 Drawing Sheets

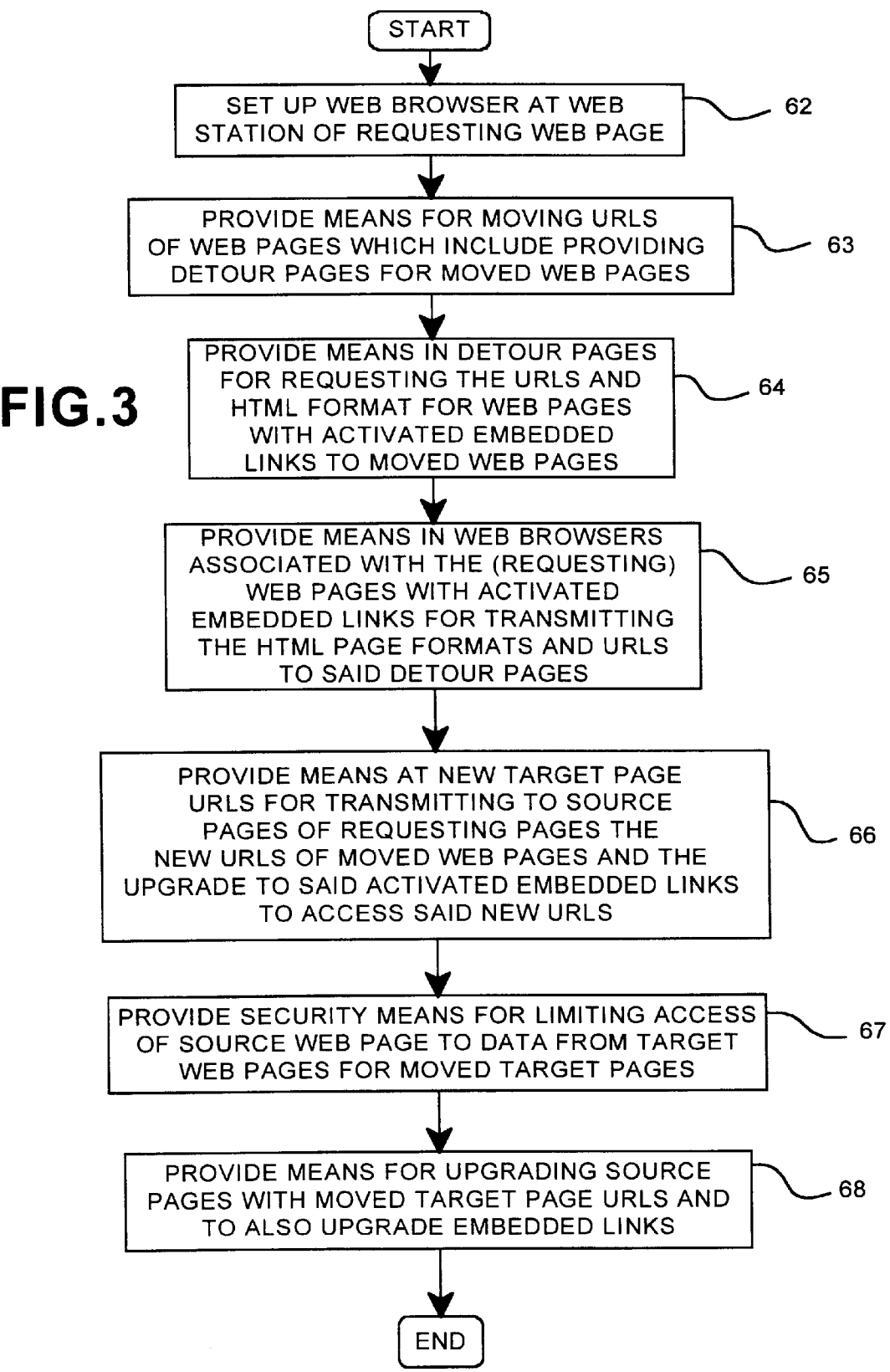

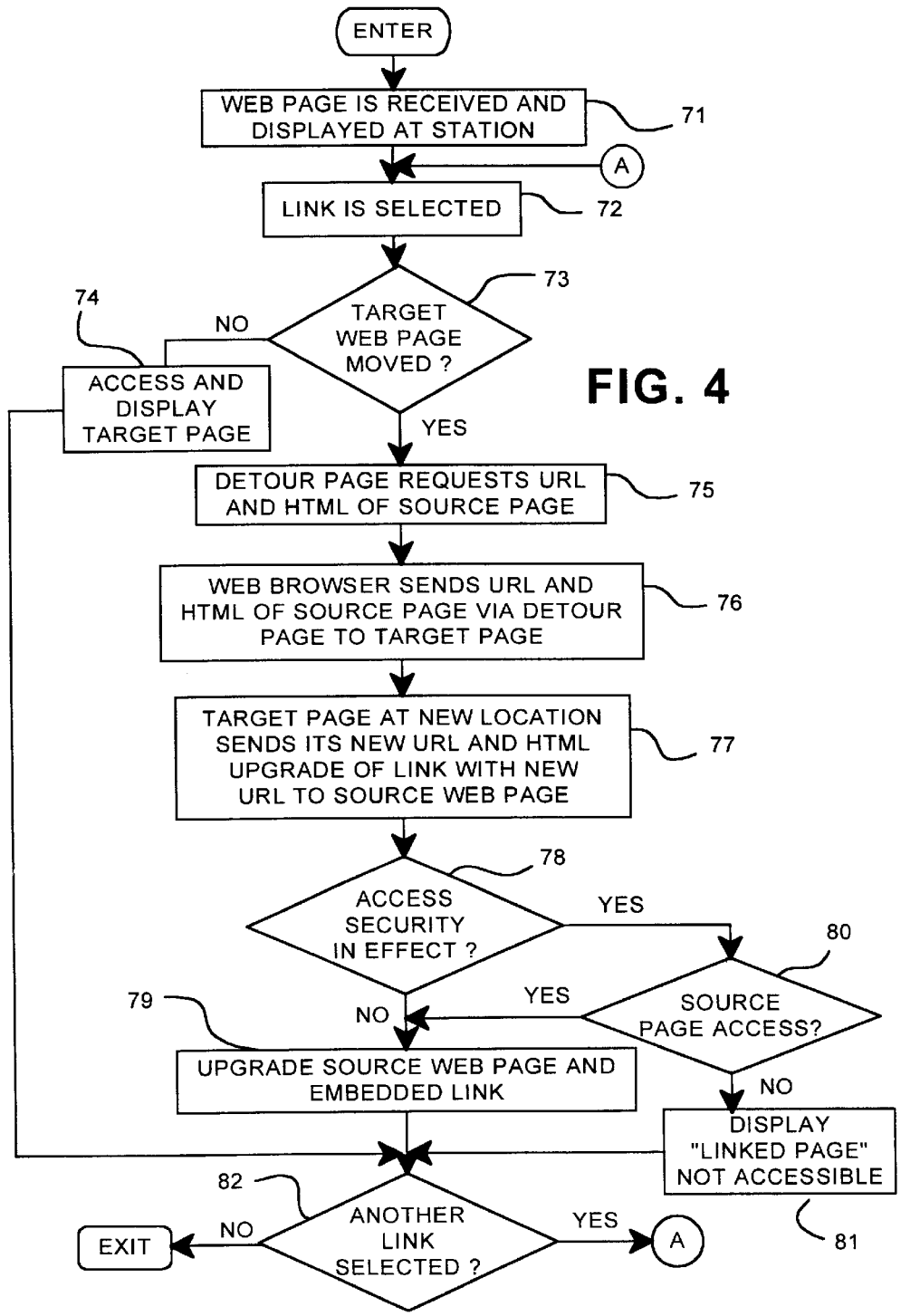

UPDATING OF EMBEDDED LINKS IN WORLD WIDE WEB SOURCE PAGES TO HAVE THE NEW URLS OF THEIR LINKED TARGET WEB PAGES AFTER SUCH TARGET WEB PAGES HAVE BEEN MOVED

TECHNICAL FIELD

The present invention relates to computer managed communication networks such as the World Wide Web (Web) and, particularly, to the updating of embedded links or hotspots in source Web pages to reflect the new Universal Resource Locations (URLs) of moved target Web Pages.

BACKGROUND OF RELATED ART

The 1990's decade has been marked by a technological revolution driven by the convergence of the data processing industry with the consumer electronics industry. The effect has, in turn, driven technologies which have been known and available but relatively quiescent over the years. A major one of these technologies is the Internet or Web related distribution of documents, media and programs. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of documents, media and computer programs.

In addition, Hypertext Markup Language (HTML), which had been the documentation language of the Internet or Web for years, offered direct links between Web pages. This even further exploded the use of the Internet or Web. It was now possible for the Web browser or wanderer to spend literally hours going through document after document in often less than productive excursions through the Web. These excursions often strained the users' time and resources. In order for the Internet to mature from its great expectations to solid commercial fruition, it will be necessary for the Internet to greatly reduce its drain on time and related resources. A significant source of this drain is in the Web page itself (the basic document page of the Web).

In the case of Web pages, we do not have the situation of a relatively small group of professional designers working out the human factors; rather, in the era of the Web, anyone and everyone can design a Web page. As a result, Web pages are frequently set up and designed in an eclectic manner. Often, there is insufficient provision made for embedded links or hotspots in such Web pages which link to target Web pages which no longer exist or have been moved and are located at new URLs. This could potentially lead to chaotic Web browsing as the user wastes time going up blind alleys.

SUMMARY OF THE PRESENT INVENTION

The present invention provides a structured way to update the URLs pointed to by embedded links in source Web pages when the target pages of such links have moved and have new URLs. The invention also can provide the host or owner of the target page with the opportunity to refuse to have the source page embedded link updated, and provide the host of the source page with the capability of not updating its embedded link to thereby eliminate the link to a new URL.

The present invention is implemented in a Web communication network with user access via a plurality of data processor controlled interactive display stations for displaying Web pages transmitted to receiving display stations from URLs remote from said stations, said Web pages being linkable with each other through embedded links in source Web page. It provides a system for updating said embedded links in source Web pages when the URL of a target Web page is moved. The basic system includes means associated with the target Web page of a selected link in a requesting Web page for informing the requesting page that the target page has moved together with means associated with the requesting page responsive to this informing means for forwarding the URL of the source Web page of the requesting page to the original URL of the target page.

Some basic definitions are provided. The source Web page is the basic Web page which contains the embedded links; it is at the URL of the owner or host who provided the page. The requesting Web page is the same source Web page having the same embedded links which was provided from the source to a user at a receiving display station. The requesting Web page is so designated because it made the selected request via an embedded link to the target Web page which has moved and thus changed its URL.

The system further includes means associated with the target page for returning the new URL of the target page to the source Web page, and means associated with the source Web page for updating the selected embedded link with the new URL of the target page. Accordingly, upon the first occurrence of a selection of a link in a requesting page to a target Web page which has moved, the above system will operate to update the source Web page link with the new URL of the moved target page so that the link will be updated in any subsequent requesting Web pages resulting from the updated source Web page.

The present invention also may include means for forwarding the contents of the source Web page along with its URL back to the original target page URL so that the means at the target page for returning the new URL of the target page also updates the selected embedded link in the source page with said new URL.

In accordance with a more particular aspect of the present invention, the means associated with the target Web page for informing the requesting Web page that the target page has moved is a detour or surrogate page. In such a particular set up, the requesting Web page may have associated Web browser means for conventional accessing of Web pages, and this browser also includes the means for forwarding the source page contents and URL via this detour page to said source page.

The present invention may also include security means for limiting access to said source page from said target page in combination with means for permitting said return of said new target page URL and said updating of said embedded link when said access limitations are met. Thus, the host who owns the source Web page is given the capability of excluding the updating of links to the new URLs by setting access limitations. This may be accomplished through a Web server connecting the display station having the source Web page to the Web, so that the security means for limiting access and the means for permitting access are included in said Web server.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 3 is an illustrative flowchart describing the setting up of the elements needed for the program for updating of embedded links in Web pages after the change in address of the target Web pages; and FIG. 4 is a flowchart of an illustrative run of the program set up in FIG. 3.

DETAILED DESCRIPTION OF THE PREFERRED EMBODIMENT

Figure 1:
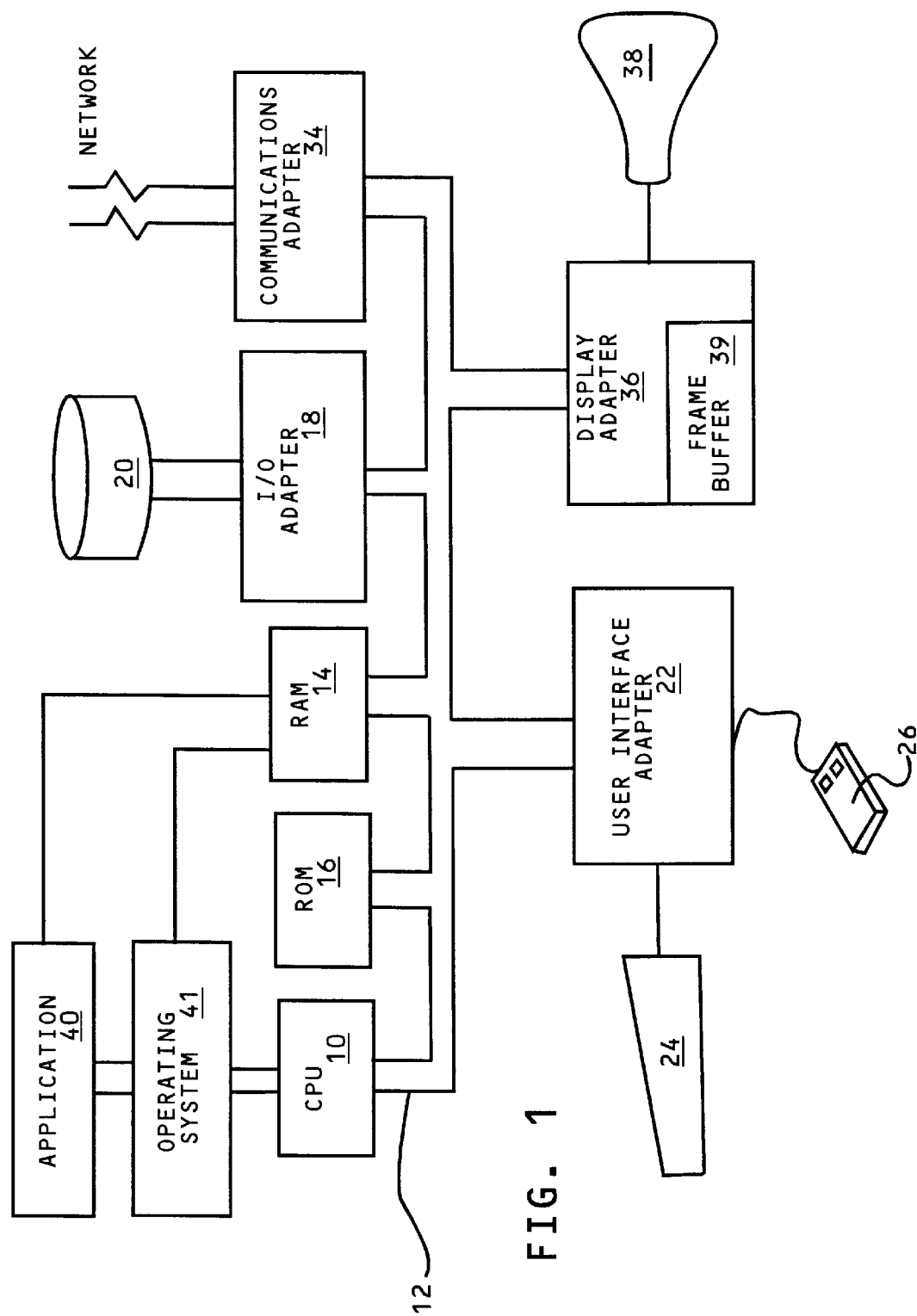
FIG. 1 is a block diagram of a data processing system including a central processing unit and network connections via a communications adapter which is capable of functioning as user interactive Web station for receiving and transmitting Web pages, e.g. source, requesting and target Web pages.

Referring to FIG. 1, a typical data processing terminal is shown which may function as the computer controlled network terminals or Web terminals used as any of the receiving or transmitting terminals for requesting, target and source Web pages in implementing the present invention for updating the URLs of target Web pages in the embedded links of source or requesting pages when the target pages move to new URLs.

A central processing unit (CPU) 10, such as one of the PC microprocessors or workstations, e.g. RISC System/6000 (™) (RS/6000) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX 6000(™) operating system available from IBM; Microsoft's Windows 98(™) or Windows NT(™), as well as UNIX and AIX operating systems. Application programs 40, controlled by the system, are moved into and out of the main memory random access memory (RAM) 14. These programs include the programs of the present invention for the updating of embedded source Web page links to moved target Web pages to be subsequently described in combination with any conventional Web browser, such as the Netscape Navigator 3.0(™) or Microsoft's Internet Explorer(™). A read only memory (ROM) 16 is connected to CPU 10 via bus 12 and includes the basic input/output system (BIOS) that controls the basic computer functions. RAM 14, I/O adapter 18 and communications adapter 34 are also interconnected to system bus 12. I/O adapter 18 may be a small computer system interface (SCSI) adapter that communicates with the disk storage device 20. Communications adapter 34 interconnects bus 12 with an outside network enabling the data processing system to communicate with other such systems over a local area network (LAN) or wide area network (WAN), which includes, of course, the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to Web pages, as well as the programming objects for performing functions relating to the Web page according to the present invention. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of a inputting information to the system through the keyboard 24 or mouse 26 and receiving output information from the system via display 38.

Before going further into the details of specific embodiments, it will be helpful to understand from a more general perspective the various elements and methods which may be related to the present invention. Since a major aspect of the present invention is directed to Web pages, transmitted over global networks, such as the Web or Internet, an understanding of networks and their operating principles would be helpful. We will not go into great detail in describing the networks to which the present invention is applicable. For details on Internet nodes, objects and links, reference is made to the text, *Mastering the Internet*, G. H. Cady et al., published by Sybex Inc., Alameda, Calif., 1996.

Any data communication system which interconnects or links computer controlled systems with various sites defines a communications network. Of course, the Internet or Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. Web documents are conventionally implemented in HTML language, which is described in detail in the text entitled *Just Java*, van der Linden, 1997, SunSoft Press, particularly at Chapter 7, pp. 249–268, dealing with the handling of Web pages; and also in the above-referenced *Mastering the Internet*, particularly pp. 637–642, on HTML in the formation of Web pages. In addition, aspects of this invention will involve Web browsers. A general and comprehensive description of browsers may be found in the above-mentioned *Mastering the Internet* text at pp. 291–313.

Figure 2:
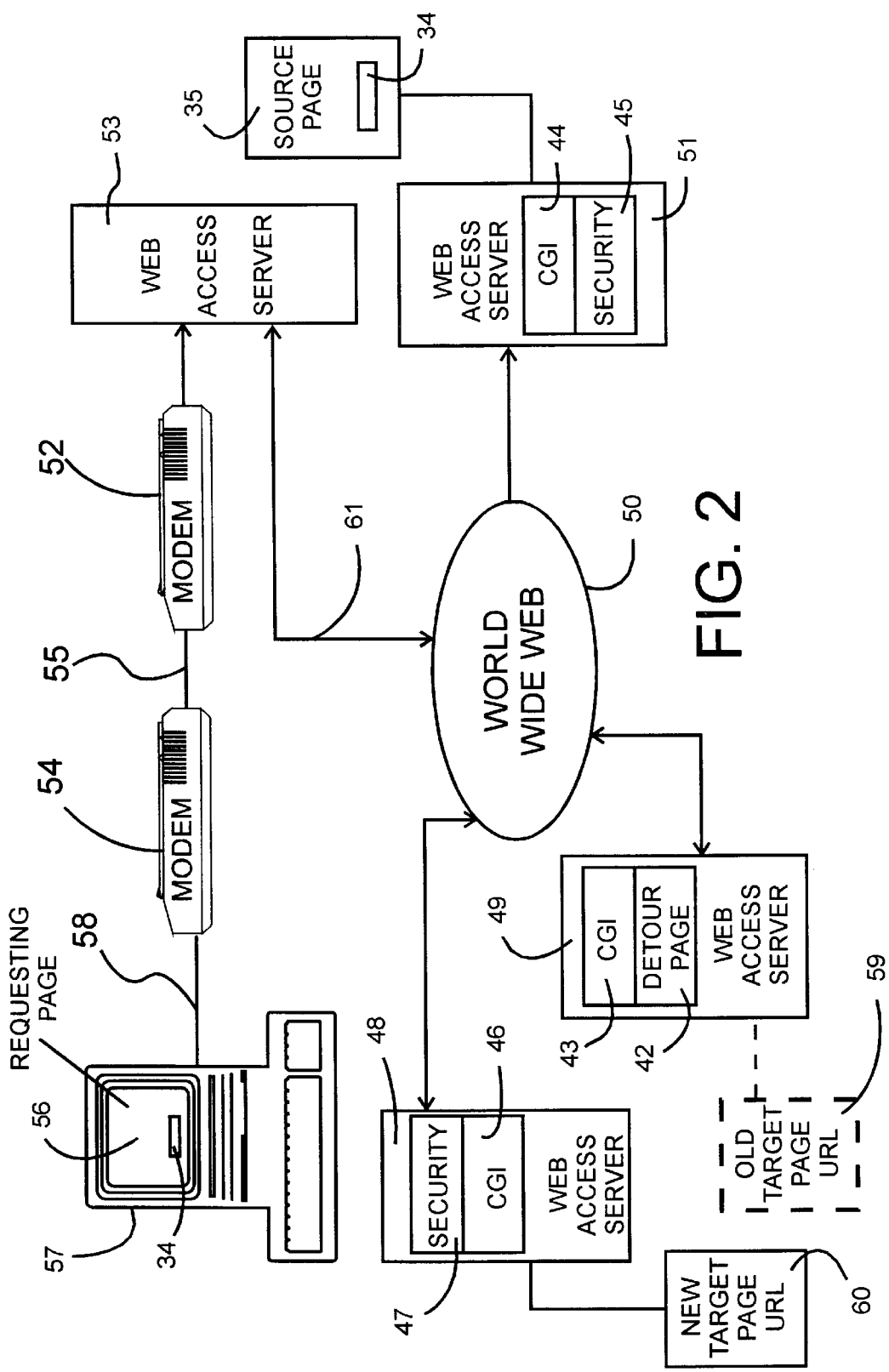
FIG. 2 is a generalized diagrammatic view of a Web portion showing how the Web may be accessed to and from the Web stations for the requesting, old target page address, new target page address and source pages.

A generalized diagram of a portion of the Internet, which the computer controlled display terminal 57 used for Web page receiving and browsing, is connected as shown in FIG. 2. Computer display terminal 57 may be implemented by the computer system setup in FIG. 1 and connection 58 (FIG. 2) is the network connection shown in FIG. 1. For purposes of the present embodiment, computer 57 serves as a Web display station and has received displayed Web page 56 containing an embedded link 34.

Reference may be made to the above-mentioned *Mastering the Internet*, pp. 136–147, for typical connections between local display stations to the Web via network servers, any of which may be used to implement the system on which this invention is used. The system embodiment of FIG. 2 has a host-dial connection. Such host-dial connections have been in use for over 30 years through network access servers 53 which are linked 61 to the Web 50. The servers 53 may be maintained by a service provider to the client's display terminal 57. The host's server 53 is accessed by the client terminal 57 through a normal dial-up telephone linkage 58 via modem 54, telephone line 55 and modem 52. The HTML file representative of the Web page 56 has been downloaded to display terminal 57 through Web access server 53 via the telephone line linkages from server 53 which may have accessed them from the Internet 50 via linkage 61.

In continuing with the description of the Web portion shown in FIG. 2, we will describe the apparatus shown within the context of what occurs when the user selects a link to a Web page the address of which has changed. Let us assume that the user of Web page 56 at display station 57 has selected link 34. Web page 56 is thereby the requesting Web page. The Web page request via link 34 is transmitted over the Web 50 through Web access server 49 to the old URL 59 of the target page to which link 34 points. However, the target Web page has moved to new URL 60, location accessible from the Web 50 through Web access server 48. However, when the target Web page was moved, there was left at the Web access server 49 which served the old URL, a surrogate or detour Web page 42. This detour page is under the protocols and control of Common Gateway Interface (CGI) 43 of server 49. The CGI in the server controls communications between server and resources. The CGI controls Web page interactivity. CGI functions are described in the *Microsoft Press Computer Dictionary* at pp. 85. As will be hereinafter described in detail with respect to the running of the program, the detour page informs the requesting page 56 that the Web page pointed to by selected link 34 has moved, and also requests the URL of the source page for requesting page 56. The source page for Web page 56, i.e. the source from which page 56 was originally transmitted over the Web, is source Web page 35 connected to Web 50 through Web access server 51. In response to the request from detour page 42, the URL of source page 35 is sent addressed to the old URL of the target page, and thus ends up at detour page 42. The computer Web station 57 customarily has an associated Web browser program as described above. This Web browser has the URL of the source page 35 since it fetched requesting page 56 from the source page 35. Since the browser also already has the contents of the source Web page 35, it may preferably also forward the contents of the source page back to the old target page URL which ends up in detour page 42 under the control of the CGI 43 in Web access server 49. If there are no access limitations which will be hereinafter described, then CGI 43 and detour page 42 will forward to source page 35 via Web 50 and Web access server 51 the updated new URL 60 of the target page and the embedded link position 34 which must be changed to point to the new URL. The source page 35 will be updated so that all subsequent request for Web pages from this source will have the new URL for link 34, and, thus, not need any further modification.

As mentioned above, the system of the present invention does provide for security, i.e. there are means associated with the source page for placing access limitations as to which links may be updated with which new URLs. For example: there will be no updates to the following URLs. Such access limitation is conducted in a security layer 45 under control of CGI 44 in Web access server 51. The target Web page at its new URL 60 accessing the Web 50 via Web access server 48 may also impose access limitations as to which source pages it will permit to update embedded links therein. For example: there will be no forwarding of the target page new URLs to source pages for the following URLs. Such access limitation is conducted in a security layer 47 under control of CGI 46 in Web access server 48.

FIG. 3 is a flowchart showing the development of a process according to the present invention for the updating of embedded links in source Web pages to reflect changes in the URLs of moved target Web pages. Most of the programming functions in the process of FIG. 3 have already been described in general with respect to FIG. 2. A Web browser is provided at a receiving display station on the Web for accessing Web pages in the conventional manner and loading them at the display station, step 62; these Web pages will function as requesting Web pages. In step 63, means are provided for the moving of the URLs of target Web pages which includes the provision of a surrogate or detour Web page 42 (FIG. 2) at the old URL of the target page. Means are provided in the detour pages for requesting the URL and HTML formats of the source Web pages of the requesting Web pages having the links to the moved target pages, step 64. Means are provided, step 65, in the Web browser associated with the requesting Web pages with the activated links (the Web browser associated with requesting page 56 on Web station 57 in FIG. 2) for transmitting to the detour page, the HTML format and URL of the source page 35 (FIG. 2). Means are provided associated with the new target page URL 60 (FIG. 2) for taking this source page HTML and URL from the detour page and for then transmitting to the source page, the new URL of the moved Web page and the upgrade of the embedded link in the source page to include this new URL, step 66. In step 67, security means are provided (security 45 and CGI 44 of server 51 in FIG. 2) for limiting the access of the source Web page to the URL upgrade data from the moved target page. Finally, means are provided for upgrading the source page (in the event that there is no security to limit access, or in the event of access security limitations, those access limitations being satisfied) with the moved target page URL and upgrade of embedded links to reflect this move, step 68.

The running of the process set up in FIG. 3 and described in connection with FIG. 2 will now be described with respect to the flowchart of FIG. 4. First, step 71, the browser loads a page off the Web at a receiving display station. Then, step 72, the user selects an embedded link on this page which now becomes the requesting page. Then a determination is made, decision step 73, as to whether the target Web page of the selected link has moved. If No, then, step 74, the target page is accessed and displayed. If Yes, then the detour page at the old target page URL requests the URL and HTML content of the source page which provided the requesting Web page, step 75. In response, the Web browser associated with the Web station on which the requesting page is displayed sends the URL and HTML content of the source page to the target page via the detour page, step 76. Then, the target page at the new location transmits to the source page, the new URL of the moved target Web page and the upgrade of the embedded link in the source page to include this new URL, step 77. Then, decision step 78, a determination is made as to whether access security is in effect at the source page. If No, then the source Web page and embedded link are upgraded to reflect the new URL of the target page, step 79. If Yes, security is in effect, then step 80, a determination is made as to whether the new URL or other access limiting conditions have been met. If Yes, the limitation conditions have been met, then the source Web page and embedded link are upgraded to reflect the new URL of the target page, step 79. If the determination from step 80 is No, the access limitations have not been satisfied, then step 81, a message like "Linked Page Not Accessible" is displayed. Then after any of step 81, 79 or 74, a further determination is made, step 82, as to whether another embedded link has been selected in the requesting Web page. If No, the Web page may be exited after the user completes his reading of it. However, if Yes, another link has been selected, then the process returns to step 72 via branch "A", and the previously described process is repeated.

In this manner, the source Web page is upgraded only once to reflect the changed URL of a linked target page. Since the source page from which the requesting Web page was derived has the changed URL link rather than just the requesting page, then that URL link will be changed in every subsequent requesting page derived from this upgraded source page.

One of the preferred implementations of the present invention is in application programs 40 made up of programming steps or instructions resident in RAM 14, FIG. 1, of Web station during various Web operations. Until required by the computer system, the program instructions may be stored in another readable medium, e.g. in disk drive 20, or in a removable memory such as an optical disk for use in a CD ROM computer input, or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a World Wide Web (Web) communication network with user access via a plurality of data processor controlled interactive display stations for displaying Web pages transmitted to receiving display stations from Uniform Resource Locations (URLs) remote from said stations, said Web pages being linkable with each other through embedded links in source Web pages respectively designating the URLs of target Web pages, a system for updating said embedded links in source Web pages when the URL of a target Web page is moved comprising:

means associated with the target Web page of a selected link in a requesting Web page for informing the receiving display station of a requesting page that the target page has moved;

means associated with the receiving display station of the requesting page responsive to said informing means for forwarding the URL of the source of the requesting page to the original URL of the target page;

means associated with the original URL of the target page for returning the new URL of the target page to the source of the requesting page; and means associated with the source of the requesting page for updating said selected link with the new URL of the target page.

2. The system of claim 1 further including means for forwarding the contents of the source Web page of the requesting page along with its URL back to the original target page URL.

3. The system of claim 2 wherein said means for returning the new URL of the target page also updates the selected embedded link in the source Web pace of the requesting page with said new URL.

4. The system of claim 3 wherein said means associated with the target page for said informing is a detour page.

5. The system of claim 4 further including Web browser means associated with said requesting page for accessing Web pages requested by said requesting page said browser including the means for forwarding said source Web page of the requesting page contents and URL to said detour page.

6. The system of claim 3 further including;

security means for limiting access to said source Web page of the requesting page from said target page; and means for permitting said return of said new target page URL and said updating of said embedded link when said access limitations are met.

7. The system of claim 6:

further including a Web server connecting the display station having the source Web page of the requesting page to the Web, and wherein said security means for limiting access and said means for permitting access are included in said Web server.

8. In a Web communication network with user access via a plurality of data processor controlled interactive display stations for displaying Web pages transmitted to receiving display stations from URLs remote from said stations, said Web pages being linkable with each other through embedded links in source Web pages respectively designating the URLs of target Web pages, a method for updating said embedded links in source Web pages when the URL of a target Web page is moved comprising:

informing the receiving display station of a requesting page through the target page original site that the target page has moved;

forwarding the URL of the source page to the original URL of the target page responsive to said informing step;

returning the new URL of the target page to the source of the requesting page; and updating said selected link in said source page of the requesting page with the new URL of the target page.

9. The method of claim 8 further including the step of:

forwarding the contents of the source Web page of the requesting page along with its URL back to the original target page URL.

10. The method of claim 9 wherein said step of returning the new URL of the target page also updates the selected embedded link in the source Web page of the requesting page to be updated with said new URL.

11. The method of claim 10 wherein said step of informing from the target page is carried out by setting up a detour page.

12. The method of claim 11 further including a Web browser process associated with said requesting page for accessing Web pages requested by said requesting page, said browser process including the steps of forwarding said source Web page of the requesting page contents and URL to said detour page.

13. The method of claim 10 further including:

the security step of limiting access to said source Web page of said requesting page from said target page; and permitting said return of said new target page URL and said updating of said embedded link when said access limitations are met.

14. The method of claim 13 wherein the system further includes a Web server connecting the display station having the source Web page of the requesting page to the Web, and wherein said security steps for limiting access and said steps for permitting access are carried out in said Web server.

15. A computer program having code recorded on a computer readable medium for updating said embedded links in source Web pages when the URL of a target Web page is moved in a Web communication network with user access via a plurality of data processor controlled interactive display stations for displaying Web pages transmitted to receiving display stations from URLs remote from said stations, said Web pages being linkable with each other through embedded links in source Web pages respectively designating the URLs of target Web pages comprising:

means associated with the target Web page of a selected link in a requesting Web page for informing the receiving display station of a requesting page that the target page has moved;

means associated with the receiving display station of the requesting page responsive to said informing means for forwarding the URL of the source of the requesting page to the original URL of the target page;

means associated with the original URL of the target page for returning the new URL of the target page to the source of the requesting page; and means associated with the source of the requesting page for updating said selected link with the new URL of the target page.

16. The computer program of claim 15 further including means for forwarding the contents of the source of the requesting page along with its URL back to the original target page URL.

17. The computer program of claim 16 wherein said means for returning the new URL of the target page also updates the selected embedded link in the source Web page of the requesting page with said new URL.

18. The computer program of claim 17 wherein said means associated with the target page for said informing is a detour page.

19. The computer program of claim 18 further including a Web browser program associated with said requesting page for accessing Web pages requested by said requesting page, said browser including the means for forwarding said source Web page of the requesting page contents and URL to said detour page.

20. The computer program of claim 17 further including:

security means for limiting access to said source web page of the requesting page from said target page; and means for permitting said return of said new target page URL and said updating of said embedded link when said access limitations are met.

21. The computer program of claim 20:

further including a Web server connecting the display station having the source Web page of the requesting page to the Web, and wherein said security means for limiting access and said means for permitting access are included in said Web server.

* * * * *